United States Patent [19]
Graves

[11] Patent Number: 5,868,172
[45] Date of Patent: Feb. 9, 1999

[54] FLOW AUGMENTING DEVICE FOR A WASTEWATER TREATMENT PLANT

[75] Inventor: Jan D. Graves, Norwalk, Ohio

[73] Assignee: Norwalk Wastewater Equipment Company, Norwalk, Ohio

[21] Appl. No.: 627,104

[22] Filed: Apr. 3, 1996

Related U.S. Application Data

[62] Division of Ser. No. 399,935, Mar. 6, 1995, Pat. No. 5,569,376.

[51] Int. Cl.$^6$ ....................................................... F16L 9/00
[52] U.S. Cl. ..................... 138/177; 138/178; 138/DIG. 4; 138/DIG. 11
[58] Field of Search .............................. 210/532.2, 195.4, 210/197, 214, 207; 138/177, 178, DIG. 4, DIG. 11

[56] References Cited

U.S. PATENT DOCUMENTS

| | | | |
|---|---|---|---|
| 2,257,524 | 9/1941 | DeBogory | 138/177 |
| 2,397,655 | 4/1946 | Francis | 138/177 |
| 2,987,186 | 6/1961 | Burgoon et al. | 210/532.2 |
| 3,964,873 | 6/1976 | Aramaki et al. | 138/DIG. 11 |
| 4,013,098 | 3/1977 | Tadokoro et al. | 138/178 |
| 4,264,213 | 4/1981 | Dillman | 138/39 |
| 4,645,055 | 2/1987 | Griese et al. | 138/178 |
| 4,757,111 | 7/1988 | Cudini | 138/172 |
| 5,207,896 | 5/1993 | Graves . | |
| 5,264,120 | 11/1993 | Graves . | |
| 5,443,098 | 8/1995 | Kertesz | 138/DIG. 11 |

Primary Examiner—David Scherbel
Assistant Examiner—James F. Hook
Attorney, Agent, or Firm—Diller, Ramik & Wight, PC

[57] ABSTRACT

A wastewater treatment apparatus is provided which includes at least an aeration chamber and a clarification chamber having a common wall therebetween, a transfer port opening through the common wall between a lower portion of the clarification chamber and the aeration chamber, an aerator mechanism in the aeration chamber for creating wastewater flow currents which flow through an inlet portion of a flow augmenting device located in the common wall above the transfer port. The flow augmenting device is a conduit or pipe having a discharge outlet adjacent the lower portion of the clarification chamber through which exits the flow from the aeration chamber resulting in solid particles being agitated and returned from the clarification chamber lower portion into the aeration chamber through the transfer port.

7 Claims, 2 Drawing Sheets

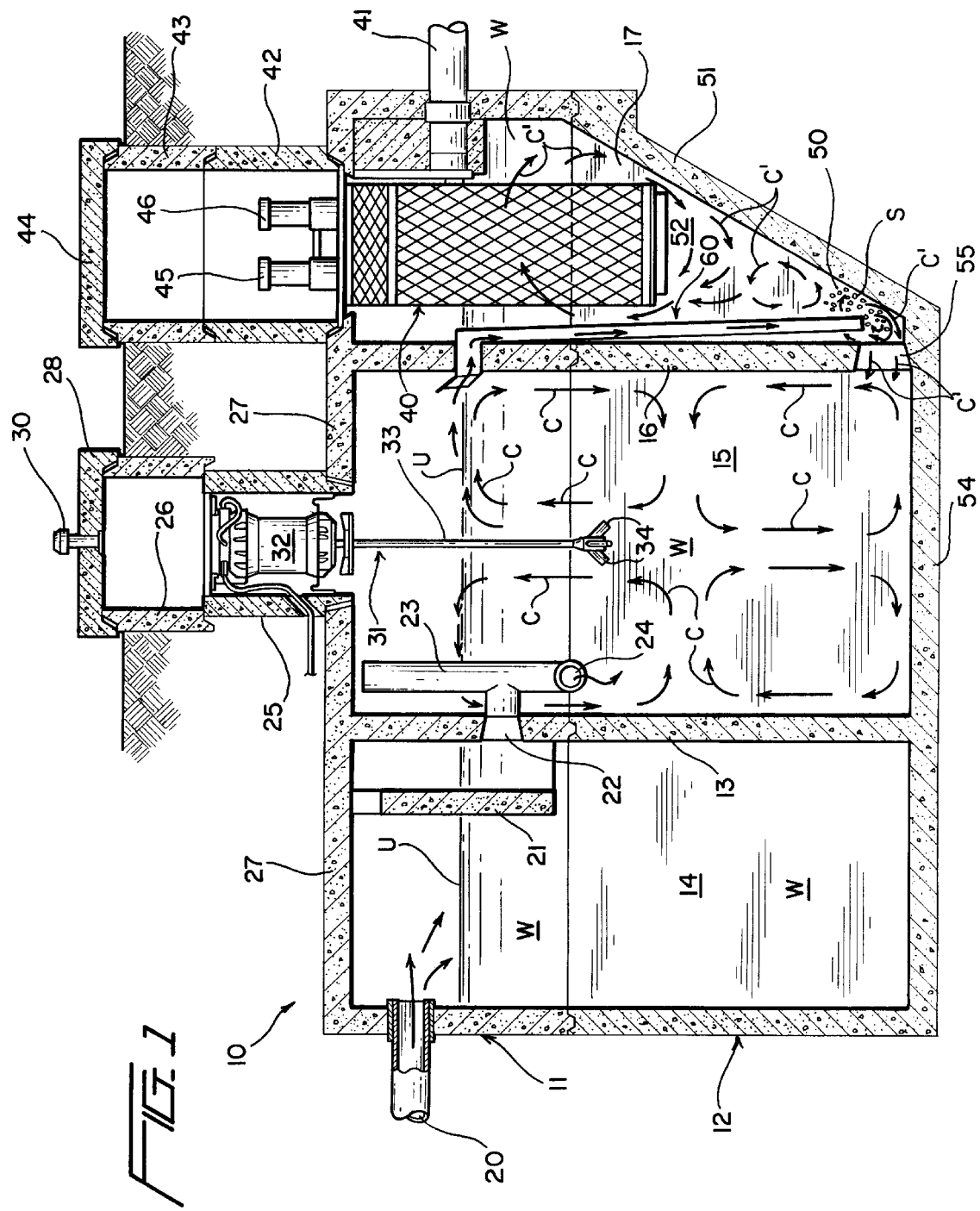

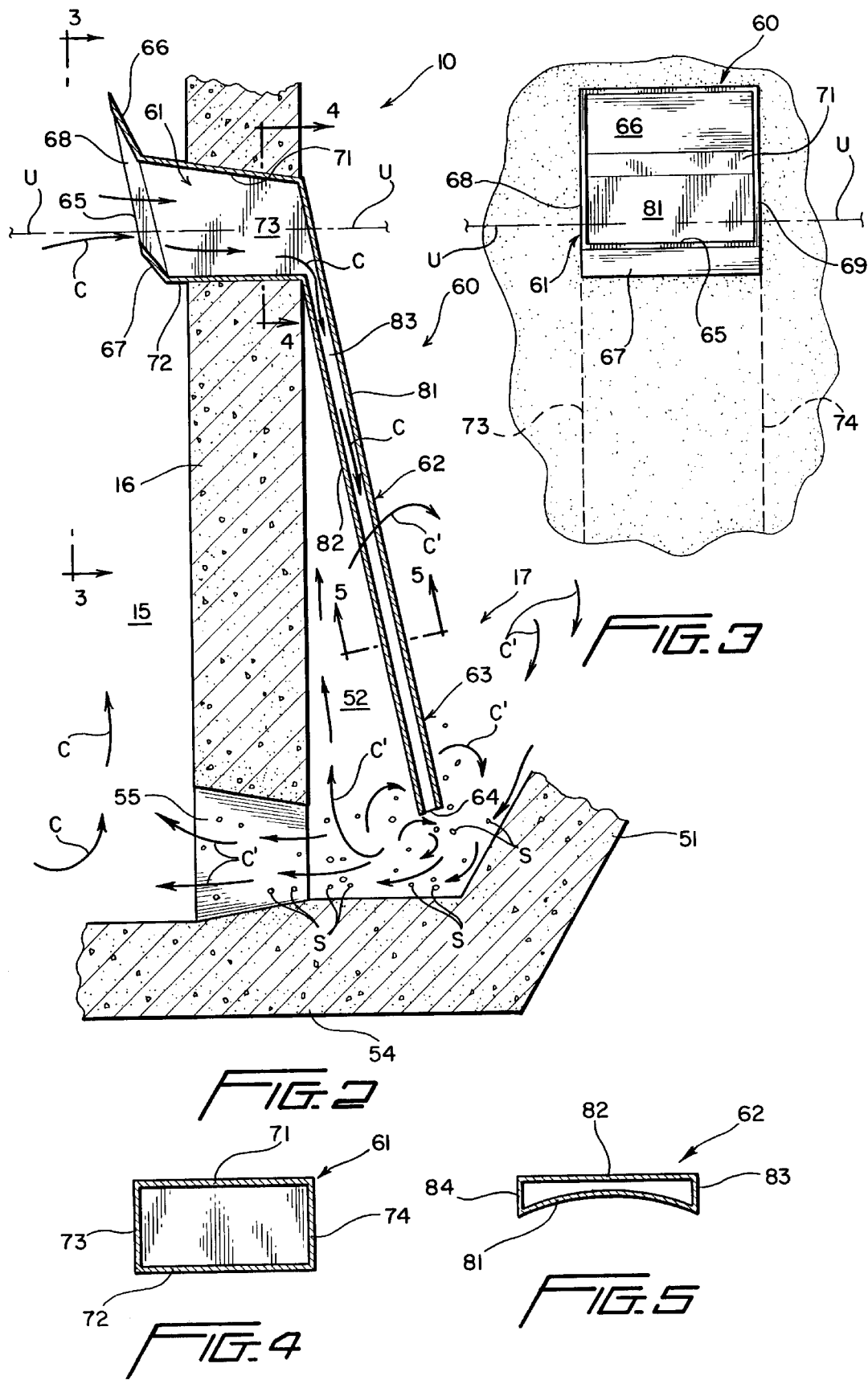

FLOW AUGMENTING DEVICE FOR A WASTEWATER TREATMENT PLANT

This application is a division of application Ser. No. 08/399,935, filed Mar. 6, 1995, now U.S. Pat. No. 5,569,376.

BACKGROUND OF THE INVENTION

This invention is an improvement in wastewater treatment plants, particularly wastewater treatment plants of the type disclosed in U.S. Pat. No. 5,207,896 granted on May 4, 1993 and U.S. Pat. No. 5,264,120 granted on Nov. 23, 1993, each being in the name of Jan D. Graves, and each being assigned to Norwalk Wastewater Equipment Co., of Norwalk, Ohio.

In wastewater treatment plants of the type disclosed in the aforesaid patents, wastewater is introduced into a pretreatment chamber, flows into an aeration chamber, proceeds to a clarification chamber, flows through the assignee's BIO-KINETIC® settling system and exits the latter through an effluent discharge pipe. A transfer port is provided at the bottom of a common wall between the aeration chamber and the clarification chamber. Activated sludge settles in a lower portion of the clarification chamber adjacent the transfer port and transient hydraulic currents created in the aeration chamber by for example, a rotating aerator having a plurality of aeration nozzles or aspirator ports, lightly agitate the solids settled in the clarification chamber and they are, in part, mixed into suspension and carried back to the aeration chamber through the transfer ports by these transient hydraulic currents. These transient hydraulic currents are somewhat random and are less than 100% effective at returning settled sludge from the lower portion of the clarification chamber back to the aeration chamber.

Settled sludge is made up of micro-organisms which accomplish the reduction of biological material in the aeration chamber, and it is essential to effectively return them to the aeration chamber. Therefore, having a less than a 100% effective return of the sludge from the clarification chamber to the aeration chamber is not advantageous for many reasons, most notable of which is that these activated sludge solids lose the benefit of being in suspension in the aeration chamber where they obtain the food and oxygen necessary to sustain themselves. Hence, they die or change to a less desirable form. Deprived of oxygen and their normal food source these micro-organisms are subject to other undesirable biological processes. These will naturally occur and can cause a degradation in effluent quality and reduce the efficiency of the overall system in removing pollutants.

As another negative side effect of accumulated sludge in the lower portion of the clarification chamber, it is first noted that aeration accomplishes oxidation of nitrogen as a concurrent but separate step with carbonaceous (organic) oxidation. The oxidized nitrogen (nitrates) remains in the sludge and in solution, but when the activated sludge is allowed to accumulate in the bottom of a clarification chamber for a sufficient time, the dissolved oxygen is consumed and the micro-organisms turn to the nitrate-bound oxygen to breathe. This releases the nitrogen from the nitrate molecule and allows it to form gas bubbles which disperse throughout the "floc" causing it to become buoyant. Once sufficiently buoyant a clump or chunk of the floc will break loose from the sludge layer and float to the surface. This process of creating a bulking of buoyant sludge due to entrapped nitrogen gas bubbles is often referred to as denitrification. The sludge may remain at the surface for a time until further biological processes break it down or the minimal hydraulic currents in the clarification chamber break it up and the gas bubbles are released into the free air. However, while floating on the surface this sludge does not receive sufficient oxygen or food to stay healthy, and it is not returned to the aeration chamber to perform additional biological reduction. The sludge may wash out of the wastewater plant or plug downstream filters and/or settling plates, such as in the BIO-KINETIC® system heretofore noted. Hence, it is extremely advantageous to preclude the formation of sludge "bulk" or "float ".

SUMMARY OF THE INVENTION

In keeping with the foregoing, a primary object of the present invention is to provide a device for augmenting wastewater flow between the clarification chamber and the aeration chamber to accomplish at least the following major functions substantially simultaneously:

1. A positive return of settled sludge from a lower portion of the clarification chamber into the aeration chamber.
2. Settled sludge that has accumulated on side walls of the clarification chamber is loosened thereby preventing a sludge build-up which would have the same negative effects as a lack of return of solids from the clarification chamber into the aeration chamber.
3. Particles driven into suspension and kept sheared by the mechanics of the aeration chamber achieve a high degree of flocculation and subsequently settle better when passing through the BIO-KINETIC® filtering/settling device.
4. The gentle mixing of the sludge at a lower portion of the clarification chamber strips small gas bubbles from entrapment within the floc particles without being intense enough to mechanically shear the floc which allows the floc to settle in the lower portion of the clarification chamber and be returned to the aeration chamber to thereby essentially preclude sludge bulking due to denitrification.

Primarily, the latter functional advantages are achieved by the novel flow augmenting device of the present invention through the utilization of a pipe or conduit having an inlet end portion opening into an upper portion of the aeration chamber and an outlet end portion adjacent the clarification chamber lower portion and the transfer port in the common wall between the aeration and clarification chambers. Hydraulic currents are created in the aeration chamber by a conventional aerator and as surface hydraulic currents radiate from the aerator they are directed into the inlet end portion of the flow augmenting device, flow down a medial portion thereof and exit the outlet end portion adjacent the transfer port at the lower portion of the clarification chamber. These currents then create sufficient turbulence to agitate suspend, and/or re-suspend settled sludge material in the clarification chamber lower portion and return the suspended sludge material from the clarification chamber lower portion through the transfer port to the aeration chamber.

Secondly, the currents created in the clarification chamber by the flow exiting the outlet end portion of the flow augmenting device induce gentle, vertical circular hydraulic currents in the clarification chamber. These vertical circular currents loosen settled sludge from inner surfaces of the walls of the clarification chamber and keep sludge from thereupon in large quantities. Activated sludge, by its nature, has a tendency to cling to the surfaces of a totally quiescent clarification chamber, and traditionally larger wastewater treatment plants use mechanical mechanisms to "scrape" the walls of the clarification chamber to inhibit this accumulation. Such mechanical scraping mechanisms are entirely eliminated by the present invention, along with costs incident to the operation and maintenance thereof.

Thirdly, as floc particles are transferred to the clarification chamber from the aeration chamber by hydraulic displacement, they tend to be very small, almost discrete particles. Even though technically they are "floc," they have been agitated and mechanically sheared by the action of the aerator of the aeration chamber. Since settling in the clarification chamber is by gravity, the smaller the particle the less effective it settles and separates from the surrounding liquid. Many larger wastewater treatment plants use specifically designed flocculation chambers which gently stir the mixture allowing increased particle contact in a low shear environment. This allows the contact of the small particles with each other. Their natural adhesion causes them to coalesce into larger particles which settle better. It also provides contact and therefore adhesion of the floc to discrete particles which would not otherwise flocculate by themselves. Therefore, removal efficiency and overall process efficiency is increased.

Lastly, the hydro-mechanical action created by the flow augmenting device strips small bubbles, specifically entrapped nitrogen gas bubbles (denitrification) entrapped within the flocced particles, without being intense enough to mechanical shear the floc. When these bubbles are released from the floc the floc can then properly settle in the lower portion of the clarification chamber and be returned to the aeration chamber through the transfer port for subsequent processing. Thus sludge bulking is minimized due to nitrification with attendant increase in process efficiency while minimizing operational problems.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a longitudinal cross sectional view of a novel wastewater treatment plant constructed in accordance with this invention and illustrates pretreatment, aeration and final clarification chambers, a BIO-KINETIC® filtering/settling mechanism in the clarification chamber, a wall common to the aeration and clarification chambers, and a device for augmenting flow of wastewater from an upper area of the aeration chamber into a lower portion of the clarification chamber to create hydraulic currents effective for returning sludge settled in the lower portion of the clarification chamber back to the aeration chamber through a transfer port of the common wall.

FIG. 2 is an enlarged fragmentary longitudinal sectional view taken through the aeration and clarification chambers and particularly the common wall thereof, and illustrates the longitudinal cross sectional configuration of the wastewater flow augmenting device including a relatively large inlet end portion thereof, an outlet end portion which directs wastewater toward a lower portion of the clarification chamber to prevent sludge from settling thereat and/or agitating settled solids back into suspension for ultimate transfer through the transfer port into the aeration chamber for subsequent processing.

FIG. 3 is an enlarged fragmentary view taken generally along line 3—3 of FIG. 2, and illustrates details of the inlet end portion of the flow augmenting device of the invention.

FIG. 4 is a cross sectional view taken generally along line 4—4 of FIG. 2, and illustrates the generally polygonal cross sectional configuration of the inlet end portion of the flow augmenting device.

FIG. 5 is a cross sectional view taken generally along line 5—5 of FIG. 2, and illustrates the generally polygonal configuration of a medial portion of the flow augmenting device with one of a pair of substantially parallel walls opening concavely outwardly.

DESCRIPTION OF THE PREFERRED EMBODIMENT

The novel method and apparatus disclosed specifically herein includes improvements in the wastewater treatment plant disclosed in the aforementioned patents in the name of Jan D. Graves, and the totality of the disclosures of these patents are incorporated herein by reference.

In keeping with the present invention a novel wastewater treatment plant or apparatus is generally designated by the reference numeral 10 (FIG. 1) and is normally designed for use with individual homes, although the same is readily adapted to many other facilities and is designed to utilize the well known digestion processes of wastewater or like fluid treatment.

The wastewater treatment plant 10 includes an upper concrete casting 11 and a lower concrete casting 12. A wall 13 is common to and separates a pretreatment chamber 14 from an aeration chamber 15. Another wall 16 is common to and separates a clarification chamber 17 from the aeration chamber 15.

Wastewater W from a suitable source (not shown) enters the pre-treatment chamber 14 through an inlet pipe 20 and flows beyond a depending baffle wall 21 through a transfer port 22 and a pipe or conduit 23 into the aeration chamber 15 via an outlet 24.

A pair of stacked concrete cylindrical risers 25,26 are supported by a top wall 27 of the upper casting 11, and the cylindrical riser 26 is closed by a concrete cover 28 which includes a conventional fresh air vent assembly 30. An aerator mechanism 31 is conventionally supported from the cylindrical riser 25 and includes a motor 32 which rotates an aerator shaft 33 having a plurality of aeration nozzles 34 from which air bubbles exit to effect extended aeration of the wastewater W within the aeration chamber 15. The rotation of the aerator 33 and the air exiting the nozzles 34 create aeration chamber wastewater currents C which, along an upper surface U of the wastewater W in the aeration chamber 15, travel generally radially away from the aerator 33.

Within the clarification chamber 17 there is located a BIO-KINETIC® filtering/settling mechanism, which is generally designated by the reference numeral 40, into and through which wastewater or effluent flows, particulate material is filtered or settled-out, and eventually the fully treated effluent discharges from the wastewater plant 10 through an effluent discharge pipe or line 41. The filtering/settling mechanism 40 is suspendingly supported from the top wall 27 of the upper casting 11 and access thereto is provided by two removable cylindrical concrete castings 42,43, the latter of which is closed by a removable concrete cover casting 44. Chlorination and dechlorination tablets are housed in respective chlorination and dechlorination tubes 45,46 for treating the effluent during its flow through the mechanism 40 and prior to exiting the effluent discharge pipe 41.

The clarification chamber 17 includes a lower chamber portion 50 defined by the common wall 16, a tapering end wall 51 and opposite spaced tapering side walls of which only one of the tapering side walls 52 is illustrated.

However, the walls 16, 51 and 52 generally define with a minor portion (unnumbered) of a bottom wall 54 the lower clarification chamber portion 50 in which solids S tend to settle or accumulate adjacent a transfer port 55 of the common wall 16 which places the aeration and clarification chambers in fluid communication with each other.

Absent a novel wastewater flow augmenting device 60 of the present invention, the solids or particles S settle by gravity adjacent the transfer port 55 as settled sludge within the lower portion 50 of the clarification chamber 17 and tend not to flow through the transfer port 55 back into the aeration chamber 15 with the resultant disadvantages heretofore noted. However, in keeping with the present invention the wastewaster flow augmenting device 60 creates hydraulic flow currents C' which gently agitate the solids S precluding the accumulation of sludge and reintroduce the solids S into the aeration chamber 15 through the transfer port 55.

The wastewater flow augmenting device 60 is essentially a conduit or pipe which, as is best illustrated in FIG. 2, includes an inlet end portion 61, a medial portion 62 and an outlet end portion 63 having an outlet 64.

The inlet end portion 61 of the flow augmenting device includes a generally polygonal inlet opening 65 defined by an upper wall 66, a lower wall 67 and opposite side walls 68,69. The walls 66,67 merge with respective walls 71,72 whereas the walls 68,69 merge with identical opposite walls 73,74 (See FIGS. 3 and 4). The walls 71–74 converge in the direction of wastewater flow which in FIG. 2 is left-to-right. The walls 71–74 of the inlet portion 61 merge with respective walls 81–84 (FIGS. 3–5) of the medial portion 62 and the outlet end portion 63. Though the entirety of the flow augmenting device 60 is of a general polygonal cross sectional configuration, the wall 81 is slightly curved opening in a concave outward direction (See FIG. 5) to afford clearance during assembly, disassembly, servicing, etc. of the filtering/settling mechanism 40 which is of cylindrical exterior configuration. In an actual structural embodiment of the invention the concave wall 81 is defined by a 7.25" radius, the walls 83,84 are approximately 3¼" and the wall 82 is 8", the measurements given being as the latter walls are viewed in FIG. 5 of the drawing.

OPERATION

As is best illustrated in FIG. 1, during the creation of the hydraulic currents C by the rotation of the aerator 33 and the air issuing from the nozzles 34, the surface currents C adjacent the upper surface U flow radially outwardly, as was described earlier and as is indicated by the upper series of wastewater flow arrows C of FIG. 1. This flow directs a portion of the wastewater W within the aeration chamber 15 into the inlet opening 65 and through the inlet end portion 61 of the wastewater flow augmenting device 60, as is best illustrated in FIG. 2 by the wastewater flow arrows C associated therewith. This flow continues down through the medial portion 62 and the outlet end portion 63 eventually exiting the outlet 64 of the wastewater flow augmenting device 60 resulting in the creation of the currents C' in the clarification chamber lower portion 50 of the clarification chamber 17. The currents C' form the numerous major functions described earlier including, of course, the agitation of the settled solids or sludge S and/or the mixture/agitation of the latter are creating unsettled solids in suspension which are carried back to the aeration chamber 15 through the transfer port 55, again as indicated by the arrows illustrating the flow direction from right-to-left in FIG. 2, for continued circulation by the current C therein. Thus, even though the wastewater flow augmenting device or flow augmentation device 60 is totally passive in its design and function in that it has no moving parts, the hydraulic currents C created in the aeration chamber 15 assure that any settled activated sludge in the clarification chamber lower portion 50 will be returned to the aeration chamber 15 strictly through the utilization of the generated aeration chamber hydraulic currents C. In other words, the hydraulic currents C created in the aeration chamber 15 are essentially transferred via the flow augmentation device 60 into the clarification chamber 17 to create the currents C' therein with attendant transfer of the particles or solids S through the transfer port 55 into the aeration chamber 15.

The currents C' also "scour" the inner surfaces of the walls 16, 51 and 52 to loosen accumulated settled sludge thereon in order to allow the latter to drift to the clarification chamber bottom portion or lower portion 50 for eventual return to the aeration chamber 15 by the currents C'. The latter avoids the attendant necessity and associated cost of mechanical scrapers now utilized in the industry, and does so in an essentially maintenance free fashion. Since mechanical scrapers and other conventional mechanical sludge return devices are not utilized with the clarification chamber 15, hydraulic currents associated with the latter which are detrimental to clarification functions are totally avoided.

It is also important to note that due to the relatively larger cross sectional configuration of the inlet end portion 61 as compared to the medial portion 62 and the outlet end portion 63 of the flow augmenting device 60, the velocity and therefore the effectiveness of the hydraulic action is increased by virtue of the Venturi effect. Thus the increase in velocity of the current flow C exiting the opening 64 assures requisite agitation of the sludge S through gentle hydro-mechanical action for sludge loosening and/or return which is best for floc preservation and minimizing floc shear. In addition, locating the discharge opening 64 of the flow augmenting device 60 adjacent the bottom wall 54 of the lower portion 50 of the clarification chamber 17 prevents short-circuiting of the hydraulic flow path and thus assures that the currents C' essentially continuously and uninterruptedly flow from the clarification lower portion 50 through the transfer port 55 into the aeration chamber 15 and eventually co-mingling with the flow currents C.

Another advantage of the flow augmenting device 60 is that larger floc particles formed in the aeration chamber 15 are carried to the bottom portion 50 of the clarification chamber 17 as opposed to being directed against the filtering/settling mechanism 40 at the upper surface U of the wastewater W within the clarification chamber 17, as would occur in the absence of the flow augmenting device 60. This effectively reduces filter/settlement "loading" of the mechanism 40 and increases the efficiency of the filtration/settlement operation thereof. This results in less cleaning and downtime of the system and optimum effluent at discharge.

Since the wastewater flow augmenting device 60 functions strictly in dependence upon the aeration currents C, the wastewater flow augmenting device 60 is automatically demand controlled. If the wastewater or biomass in the aeration chamber 15 grows in volume, the operational adjustment recommended for proper control would be to increase the run time of the aerator mechanism 31, and additional biomass in the aeration chamber 15 would also result in increased settled sludge in the clarification chamber 17, both in the lower portion 50 and upon the walls 16, 51 and 52 thereof. With the additional increase in running time there is a corresponding increase in the total flow through the wastewater flow augmenting device 60 which results in (a) an increase in the return of settled sludge or solids S to the aeration chamber 15 from the clarification chamber 17 via the transfer port 55, (b) additional scouring of the walls 16, 51 and 52 by the hydraulic currents C', and (c) additional flocculation time.

Apart from an increase in run time, the wastewater treatment plant 10 normally operates in a cyclical fashion with the aerator mechanism 31 operating during an "on" cycle and being cut-off during an "off" cycle. During such an "off" cycle there are more opportunities for the floc particles to contact each other and to contact discrete particles. This aids in "polishing" the biomass. Additionally, each time the flocculation process is cycled, the floc undergoes alternate flocculation and settling and such intermittent settling provides more opportunities for the floc particles to contact each other and to contact discrete particles, again aiding in the polishing of the liquid. During the "on" cycle the currents C' created by the wastewater flow augmenting device 60 inherently augment this polishing action through the continuous agitation of the particles S.

Although a preferred embodiment of the invention has been specifically illustrated and described herein, it is to be understood that minor variations may be made in the apparatus without departing from the spirit and scope of the invention, as defined in the appended claims.

I claim:

1. A static wastewater conduit for transferring wastewater from an upper portion of an aeration chamber to a lower portion of a clarification chamber comprising a pipe defined by an inlet end portion, a medial portion and an outlet end portion; said medial portion and outlet end portion having a generally coincident flow axis defining an obtuse angle with a flow axis of said inlet end portion, said inlet end portion converging in the direction of wastewater flow toward said medial portion, said inlet end portion being of a generally polygonal cross sectional configuration, said outlet end portion being of a generally polygonal cross sectional configuration, said medial portion being of a generally polygonal cross sectional configuration, and the transverse cross sectional area of said outlet end portion being substantially less than the transverse cross sectional area of said inlet end portion.

2. The static wastewater conduit as defined in claim 1 wherein said medial portion includes a pair of spaced generally parallel walls, and one of said pair of generally parallel walls opens concavely outwardly.

3. The static wastewater conduit as defined in claim 1 wherein said inlet end portion includes an upstream-most peripheral flange defining a flow axis at an obtuse angle to the flow axis of said inlet end portion.

4. The static wastewater conduit as defined in claim 1 wherein said outlet end portion includes a pair of spaced generally parallel walls, and one of said pair of generally parallel walls opens concavely outwardly.

5. The static wastewater conduit as defined in claim 4 wherein said inlet end portion includes an upstream-most peripheral flange defining a flow axis at an obtuse angle to the flow axis of said inlet end portion.

6. The static wastewater conduit as defined in claim 1 wherein said medial portion and said outlet end portion each include a pair of spaced generally parallel walls, and one of each of said pair of generally parallel walls opens concavely outwardly.

7. The static wastewater conduit as defined in claim 6 wherein said inlet end portion includes an upstream-most peripheral flange defining a flow axis at an obtuse angle to the flow axis of said inlet end portion.

\* \* \* \* \*